United States Patent
Otsuka

(10) Patent No.: US 10,391,969 B2
(45) Date of Patent: Aug. 27, 2019

(54) HEAT-RESISTANCE INCREASING FABRIC SHEET FOR AIRBAG

(71) Applicant: TOYODA GOSEI CO., LTD., Kiyosu-shi, Aichi-ken (JP)

(72) Inventor: Masakatsu Otsuka, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 15/915,135

(22) Filed: Mar. 8, 2018

(65) Prior Publication Data
US 2018/0281738 A1    Oct. 4, 2018

(30) Foreign Application Priority Data

Mar. 31, 2017 (JP) .................. 2017-070268
Dec. 5, 2017 (JP) .................. 2017-233543

(51) Int. Cl.
*B60R 21/235* (2006.01)
*B60R 21/264* (2006.01)
(Continued)

(52) U.S. Cl.
CPC ............ *B60R 21/235* (2013.01); *B32B 5/024* (2013.01); *B32B 15/08* (2013.01); *B32B 15/14* (2013.01);
(Continued)

(58) Field of Classification Search
CPC ......... B32B 15/08; B32B 15/14; B32B 15/20; B32B 2250/03; B32B 2262/062; B32B 2307/306; B32B 2571/00; B32B 2605/00; B32B 27/34; B32B 5/024; B60R 2021/23123; B60R 2021/23514; B60R 2021/23528; B60R 21/231; B60R 21/235; B60R 21/264

See application file for complete search history.

(56) References Cited

U.S. PATENT DOCUMENTS 5,580,651 A * 12/1996 Kerman ............... B29C 44/1266
                                                      428/318.4
2002/0033589 A1* 3/2002 Barnes .................... B32B 27/12
                                                      280/728.1
(Continued)

FOREIGN PATENT DOCUMENTS

JP    H03-287433 A    12/1991
JP    H07-277121 A    10/1995

*Primary Examiner* — Arti Singh-Pandey
(74) *Attorney, Agent, or Firm* — Posz Law Group, PLC

(57) ABSTRACT

A heat-resistance increasing fabric sheet for an airbag is used in an airbag that is deployed and inflated by inflation gas discharged from a gas outlet portion of an inflator. The heat-resistance increasing fabric sheet is configured to increase the heat resistance of a member subjected to an increase in heat resistance. The heat-resistance increasing fabric sheet includes a base fabric sheet, a heat-resistant layer, and a top coat layer. The base fabric sheet is made of cotton fibers and arranged between the member subjected to an increase in heat resistance and the gas outlet portion. The heat-resistant layer is made of aluminum foil laminated on a surface of the base fabric sheet that faces the gas outlet portion. The top coat layer is made of a plastic film laminated on a surface of the heat-resistant layer that faces the gas outlet portion.

7 Claims, 10 Drawing Sheets

(51) Int. Cl.
*B60R 21/231* (2011.01)
*B32B 5/02* (2006.01)
*B32B 15/14* (2006.01)
*B32B 15/08* (2006.01)
*B32B 15/20* (2006.01)
*B32B 27/34* (2006.01)
*B60R 21/207* (2006.01)
*B60R 21/213* (2011.01)
*B60R 21/217* (2011.01)

(52) U.S. Cl.
CPC .............. *B32B 15/20* (2013.01); *B32B 27/34* (2013.01); *B60R 21/207* (2013.01); *B60R 21/213* (2013.01); *B60R 21/2171* (2013.01); *B60R 21/231* (2013.01); *B60R 21/264* (2013.01); *B32B 2250/03* (2013.01); *B32B 2262/062* (2013.01); *B32B 2307/306* (2013.01); *B32B 2571/00* (2013.01); *B32B 2605/00* (2013.01); *B60R 2021/23123* (2013.01); *B60R 2021/23504* (2013.01); *B60R 2021/23509* (2013.01); *B60R 2021/23514* (2013.01); *B60R 2021/23528* (2013.01)

(56) References Cited

U.S. PATENT DOCUMENTS

| | | | |
|---|---|---|---|
| 2015/0071978 A1* | 3/2015 | Chang | A61N 2/06 424/402 |
| 2015/0266264 A1* | 9/2015 | Lowe | B32B 5/024 280/741 |
| 2015/0266432 A1* | 9/2015 | Fujita | B60R 13/0256 280/728.3 |
| 2016/0236636 A1* | 8/2016 | Rao | B60R 21/235 |

* cited by examiner

HEAT-RESISTANCE INCREASING FABRIC SHEET FOR AIRBAG

BACKGROUND OF THE INVENTION

The present invention relates to a heat-resistance increasing fabric sheet for an airbag that increases the heat resistance of an airbag, which is deployed and inflated by inflation gas discharged from an inflator.

An airbag apparatus is effective for protecting an occupant from an impact when an impact due to, for example, a collision is applied to the vehicle. The airbag apparatus generally includes an inflator, which discharges inflation gas through a gas outlet portion, and an airbag, which is deployed and inflated by the inflation gas.

In such an airbag apparatus, high-pressure inflation gas of 500° C. or higher is discharged from the gas outlet portion. The main body fabric portion, which forms the outer shape of the airbag, is generally formed by using polyamide fiber or polyester fiber. The melting points of polyamide and polyester are about 250° C. When the heat of high-temperature inflation gas is transferred, the main body fabric portion is carbonized instantaneously and the carbonized parts are scattered by the pressure of the inflation gas to form holes. One countermeasure against this is to place multiple heat-resistance increasing fabric sheets made of the same material as the main body fabric portion on a part of the inner surface of the main body fabric portion that is susceptible to the heat of the inflation gas. According to this countermeasure, the inflation gas is received by the multiple heat-resistance increasing fabric sheets. Thus, the heat of the inflation gas is unlikely to reach the main body fabric portion, suppressing the formation of holes in the main body fabric portion.

However, as the number of the heat-resistance increasing fabric sheets increases, it becomes more difficult to sew the heat-resistance increasing fabric sheets to the main body fabric portion. Also, as the number of the heat-resistance increasing fabric sheets increases, the airbag becomes not only less foldable but also heavier. Further, the bulk of the folded airbag becomes large, reducing the mountability of the airbag.

In this regard, heat-resistance increasing fabric sheets obtained by laminating a heat-resistant layer on a base fabric sheet have been developed (for example, Japanese Laid-Open Patent Publications No. 3-287433 and No. 7-277121). The heat-resistant layer is made of aluminum foil. The heat-resistant layer is denoted as "coating layer" in Japanese Laid-Open Patent Publication No. 3-287433 and "heat-resistant coating layer" in Japanese Laid-Open Patent Publication No. 7-277121. The base fabric sheet is denoted as "fabric" in Japanese Laid-Open Patent Publications No. 3-287433 and No. 7-277121.

A heat-resistant layer made of aluminum foil has a melting point (approximately 650° C.) higher than the temperature of inflation gas and increases the heat resistance of the heat-resistance increasing fabric sheet. On the other hand, when used alone, the aluminum foil constituting the above heat-resistant layer tends to degrade with age due to oxidation and electrolytic corrosion. For example, a metal (iron) ring retainer may be used when installing an inflator and an airbag in a driver's seat airbag apparatus. In such a case, if the heat-resistant layer contacts the ring retainer in a situation where moisture (including moisture in the air) is present, electrolytic corrosion may occur. Japanese Laid-Open Patent Publications No. 3-287433 and No. 7-277121 disclose no particular countermeasures against these problems.

Also, depending on the material of the base fabric sheet, the tensile strength and tear strength of the heat-resistant layer are not sufficient. Thus, in the above heat-resistance increasing fabric sheet, the heat-resistant layer may be peeled from the base fabric sheet during the deployment and inflation of the airbag.

SUMMARY OF THE INVENTION

Accordingly, it is an objective of the present invention to provide a heat-resistance increasing fabric sheet for an airbag capable of suppressing aging deterioration of a heat-resistant layer and peeling of a heat-resistant layer from a base fabric sheet.

To achieve the foregoing objectives, a heat-resistance increasing fabric sheet for an airbag is provided. The airbag is deployed and inflated by inflation gas discharged from a gas outlet portion of an inflator. A plurality of members constituting the airbag includes a plurality of direct injection gas contacting members, which contact the inflation gas. At least one of the direct injection gas contacting members is defined as a member subjected to an increase in heat resistance. The heat-resistance increasing fabric sheet is configured to increase a heat resistance of the member subjected to an increase in heat resistance. The heat-resistance increasing fabric sheet includes a base fabric sheet, which is made of cotton fibers and arranged between the member subjected to an increase in heat resistance and the gas outlet portion, a heat-resistant layer, which is made of aluminum foil laminated on a surface of the base fabric sheet that faces the gas outlet portion, and a top coat layer, which is made of a plastic film laminated on a surface of the heat-resistant layer that faces the gas outlet portion.

DETAILED DESCRIPTION OF THE PREFERRED EMBODIMENTS

First Embodiment

A heat-resistance increasing fabric sheet 26 according to a first embodiment will now be described with reference to FIGS. 1 and 2. The heat-resistance increasing fabric sheet 26 is used in a driver's seat airbag apparatus 10.

The driver's seat airbag apparatus 10 is installed in the steering wheel of a vehicle and is designed to protect the driver from an impact by deploying and inflating an airbag 22 when an impact is applied to or predicted to be applied to the vehicle from the front.

Figure 1:
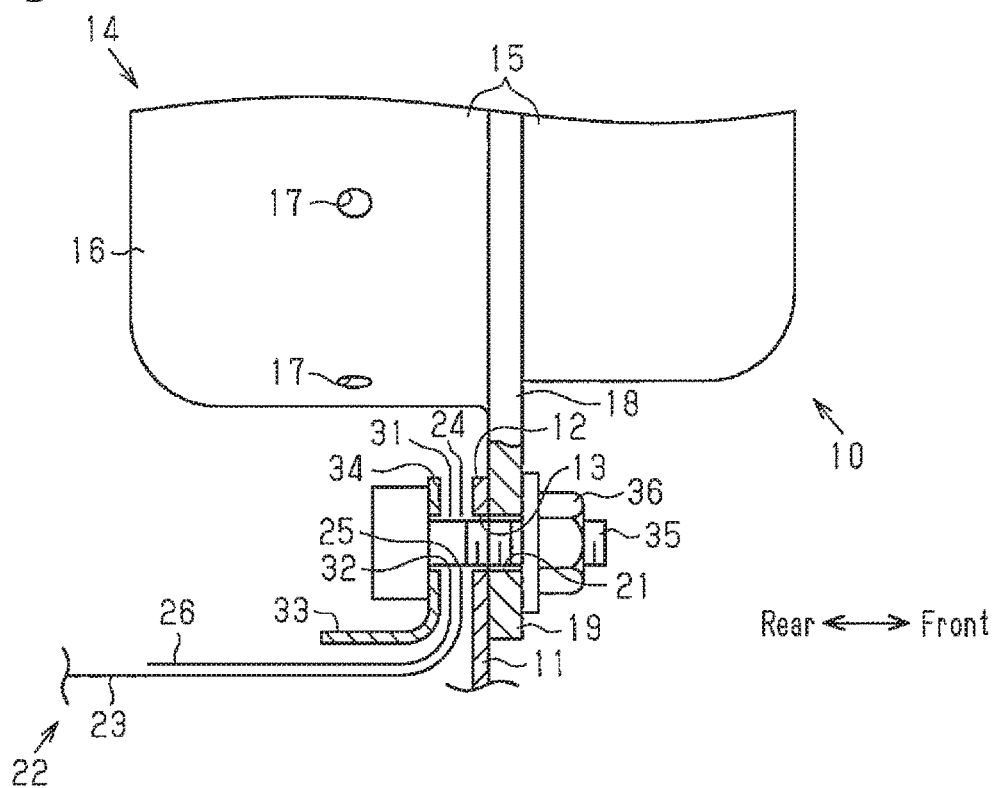
FIG. 1 is a diagram showing a first embodiment, in which a heat-resistance increasing fabric sheet for an airbag (hereinafter, simply referred to as "heat-resistance increasing fabric sheet") is used in a driver's seat airbag apparatus, illustrating a partial cross-sectional view of a part in which the heat-resistance increasing fabric sheet is used.

FIG. 1 illustrates a part of the driver's seat airbag apparatus 10. The airbag apparatus 10 is arranged inside the pad portion (not shown) of the steering wheel of the vehicle. The front-rear direction in FIG. 1 coincides with the axial direction of the steering shaft of the steering wheel. Accordingly, the front-rear direction in FIG. 1 is slightly inclined with respect to the front-rear direction of the vehicle.

As shown in FIG. 1, the driver's seat airbag apparatus 10 includes a bag holder 11, an inflator (gas generator) 14, the airbag 22, and a ring retainer 33. The bag holder 11 is supported by the core (not shown) of the steering wheel. The bag holder 11 has an opening 12 in the central section. The bag holder 11 also has screw insertion holes 13 at multiple positions on the edge of the opening 12.

A disk-type inflator is used as the inflator 14. The inflator 14 includes a main body 15 having a shape of a flattened column and a flange 18 formed on the outer circumferential surface of the main body 15. The main body 15 accommodates a gas generating agent (not shown), which generates inflation gas for deploying and inflating the airbag 22. The flange 18 is provided in the middle part in the front-rear direction along the axis of the main body 15. The flange 18 has multiple attaching portions 19 extending outward in the radial direction of the main body 15. Each attaching portion 19 has a screw insertion hole 21 at a position forward of the corresponding screw insertion hole 13 of the bag holder 11. The portion of the main body 15 that is rearward of the flange 18 constitutes a gas outlet portion 16. The gas outlet portion 16 has gas discharging holes 17 for discharging inflation gas outward in the radial direction.

The outer shape of the airbag 22 is formed by a main body fabric portion 23. The main body fabric portion 23 is made of a fabric that is woven using polyamide fiber or polyester fiber, which is a material having high strength and flexibility. The main body fabric portion 23 has an insertion port 24 for inserting the gas outlet portion 16. The main body fabric portion 23 has screw insertion holes 25 on the edge of the insertion port 24. The screw insertion holes 25 are located at positions rearward of the screw insertion holes 13 of the bag holder 11.

The airbag 22 further has a flow-regulating fabric sheet (not shown) for regulating the flow of inflation gas discharged from the gas outlet portion 16.

The driver's seat airbag apparatus 10 has a heat-resistance increasing fabric sheet 26 in addition to the airbag 22. Some of the members constituting the airbag 22 are brought into contact with the inflation gas discharged from the gas outlet portion 16 and are referred to as direct injection gas contacting members. The heat-resistance increasing fabric sheet 26 is used to increase the heat resistance of the main body fabric portion 23, which is one of the direct injection gas contacting members. That is, in the first embodiment, the main body fabric portion 23, which is one of the direct injection gas contacting members, is defined as a member subjected to an increase in heat resistance by the heat-resistance increasing fabric sheet 26. As shown in FIG. 2, the heat-resistance increasing fabric sheet 26 has a three-layer structure with a base fabric sheet 27, a heat-resistant layer 28, and a top coat layer 29.

The base fabric sheet 27 is arranged between the main body fabric portion 23 and the gas outlet portion 16 and is made of a plain-woven fabric that is woven using yarn (cotton yarn) made of cotton fibers. The plain-woven fabric has a thickness from 10 μm to 100 μm. Since the base fabric sheet 27 has a thickness from 10 μm to 100 μm, the necessary heat resistance is obtained and the insufficient strength of the aluminum foil, which constitutes the heat-resistant layer 28, which will be discussed below, is effectively compensated. Also, the airbag 22 is prevented from becoming less foldable or excessively bulky when folded. In the first embodiment, a plain-woven fabric having a thickness of 50 μm is used as the base fabric sheet 27. The plain-woven fabric is woven by alternately crisscrossing warp threads 27a and weft threads 27b. Although the warp threads 27a and the weft threads 27b are each constituted by multiple cotton fibers, the illustration of the respective cotton fibers is omitted in FIG. 2. As the plain-woven fabric, the one with the following tensile strengths is used: at least 400 newtons in the arrangement direction of the warp threads 27a when a test piece having a width of 3 cm is used, and at least 400 newtons in the arrangement direction of the weft threads 27b when a test piece having a width of 3 cm is used.

The heat-resistant layer 28 is made of aluminum foil having a thickness from 5 μm to 30 μm and is laminated on the surface of the base fabric sheet 27 that faces the gas outlet portion 16. In the first embodiment, aluminum foil that has a thickness of 15 μm and a small number of small holes called pinholes.

The top coat layer 29 is made of a plastic film having a thickness from 5 μm to 30 μm and is laminated on the surface of the heat-resistant layer 28 that faces the gas outlet portion 16. As the plastic film, a polyamide (PA) film, a polyethylene (PE) film, an oriented polypropylene (OPP)

film, a polyethylene terephthalate (PET) film, or a polyvinylidene chloride (PVDC) film is used. The oriented polypropylene (OPP) film is a plastic film whose oriented crystallinity has been increased by being stretched in the longitudinal and transverse directions in the manufacturing process. The thickness of the top coat layer 29 being from 5 μm to 30 μm effectively suppresses the phenomenon of oxygen or moisture (including moisture in the air) contacting the heat-resistant layer 28, which is constituted by aluminum foil. In the first embodiment, a plastic film made of polyamide 66 having a thickness of 15 μm is used as the top coat layer 29.

The above-described heat-resistance increasing fabric sheet 26, which has a three-layer structure, is formed by laminating aluminum foil on plain-woven fabric and laminating a plastic film on the aluminum foil by a lamination method such as dry lamination. The dry lamination is a method in which adhesive is applied to the surface of one of two sheets to be laminated, then the solvent of the adhesive is evaporated in a drying apparatus, and the sheet is laminated on the other sheet by thermocompression bonding. As a method for laminating a plastic film on aluminum foil, an extrusion coating lamination may be employed. The extrusion coating lamination is a method in which a thermoplastic resin is molten and extruded to have the form of a film and lamented onto a substrate (aluminum foil in this case).

As shown in FIG. 1, the heat-resistance increasing fabric sheet 26 has an insertion port 31 for inserting the gas outlet portion 16 in its central section. The heat-resistance increasing fabric sheet 26 is superposed on the main body fabric portion 23 at the base fabric sheet 27 from inside with the insertion port 31 aligned with the insertion port 24 of the main body fabric portion 23. The heat-resistance increasing fabric sheet 26 has screw insertion holes 32 on the edge of the insertion port 31. The screw insertion holes 32 are located at positions rearward of the screw insertion holes 13 of the bag holder 11.

The heat-resistance increasing fabric sheet 26 is formed into a required shape by punching out with a blade an elongated film (original fabric) of a three-layer structure formed by laminating a plastic film and a plain-woven fabric on the opposite sides of aluminum foil as described above.

A ring retainer 33 is provided inside the main body fabric portion 23 and in the vicinity of the insertion ports 24 and 31. The ring retainer 33 is made of a metal material (iron) of a different kind from the aluminum foil constituting the heat-resistant layer 28. The ring retainer 33 has an opening 34 the shape of which is the same as that of the opening 12 of the bag holder 11. Also, the ring retainer 33 has attaching screws 35 located at positions rearward of the screw insertion holes 13 of the bag holder 11.

The gas outlet portion 16 of the inflator 14 is inserted into the openings 12, 34 of the bag holder 11 and the ring retainer 33 and the insertion ports 24, 31 of the main body fabric portion 23 and the heat-resistance increasing fabric sheet 26. The flange 18 is superposed on the bag holder 11 from the front. Although not illustrated, many parts of the airbag 22 are folded into a compact form and accommodated between the pad portion and the bag holder 11.

The attaching screws 35 of the ring retainer 33 are inserted into the screw insertion holes 32, 25, 13, 21 of the heat-resistance increasing fabric sheet 26, the main body fabric portion 23, the bag holder 11, and the flange 18 from the rear. This insertion positions the heat-resistance increasing fabric sheet 26 with respect to the main body fabric portion 23. Further, nuts 36 are fastened to the inserted attaching screws 35 from the front, so that the main body fabric portion 23 and the heat-resistance increasing fabric sheet 26 are fixed to the bag holder 11 via the ring retainer 33, and the inflator 14 is fixed to the bag holder 11 at the flange 18.

Operation and advantages of the first embodiment, which is configured as described above, will now be described.

In the driver's seat airbag apparatus 10, inflation gas is not discharged from the gas outlet portion 16 of the inflator 14 at the normal time when no impact is applied to the vehicle from the front due to a frontal collision or when such application of impact is not predicted. Therefore, the airbag 22 remains folded.

At this time, in the heat-resistance increasing fabric sheet 26, the top coat layer 29, which is made of a plastic film, covers the heat-resistant layer 28 from the side corresponding to the gas outlet portion 16. The top coat layer 29 restricts oxygen from contacting the heat-resistant layer 28, which is made of aluminum foil. Further, the top coat layer 29 restricts the heat-resistant layer 28 from contacting circumjacent components made of a metal material different from aluminum, for example, the ring retainer 33, in a situation where moisture (including moisture in the air) is present. Thus, it is possible to suppress aging deterioration due to oxidation and electrolytic corrosion of the heat-resistant layer 28 at the normal time before the driver's seat airbag apparatus 10 is activated.

When an impact is applied to the vehicle from the front, for example, due to a frontal collision, the body of the driver acts to lean forward due to the inertia. Meanwhile, in the driver's seat airbag apparatus 10, when it is detected that an impact is applied to the vehicle from the front or when it is predicted that an impact will be applied, the inflator 14 is activated to discharge inflation gas radially outward from the gas discharge holes 17 of the gas outlet portion 16. The inflation gas strikes parts of the heat-resistance increasing fabric sheet 26 around the gas outlet portion 16. The inflation gas is restricted from directly striking parts of the main body fabric portion 23 about the gas outlet portion 16 by the heat-resistance increasing fabric sheet 26.

The inflation gas is supplied to the airbag 22, deploying and inflating the airbag 22. As the pressing force applied to the pad portion by the main body fabric portion 23 of the airbag 22 increases, the pad portion is ruptured. The airbag 22 continues to be deployed and inflated rearward through the opening formed by the rupture. The deployed and inflated airbag 22 is located in front of the driver, whose body is acting to lean forward due to the impact of the frontal collision, and restrains the head the driver to protect it from the impact.

The aluminum foil constituting the heat-resistant layer 28 has a melting point higher than the temperature of the inflation gas and exerts the heat resistance. Also, since the aluminum foil has gas barrier properties when made to have a certain thickness, the high-temperature inflation gas is prevented from passing through the aluminum foil and directly contacting the base fabric sheet 27.

In addition to this, the carbonization point of cotton fiber (cellulose) constituting the base fabric sheet 27 is 500° C. to 580° C., which is higher than the melting point of a common plastic. For this reason, cotton fiber resists carbonization by the heat of the inflation gas, and holes are unlikely to be formed in the base fabric sheet 27.

Thus, the use of the heat-resistance increasing fabric sheet 26 causes the heat of the inflation gas to be less likely to be transferred to the main body fabric portion 23. Therefore, the main body fabric portion 23 is prevented from being carbonized by the inflation gas, and no holes will be formed due to scattering carbonized parts. In addition, the heat-resistance increasing fabric sheet 26 itself has a higher heat resistance than the main body fabric portion 23. Therefore, the number the heat-resistance increasing fabric sheets 26 used for ensuring the heat resistance can be reduced as compared with the case in which the same material as the main body fabric portion 23 is used as the heat-resistance increasing fabric sheet. This resolves the problems caused of the airbag 22 by an increase in the number of the heat-resistance increasing fabric sheets 26, such as a reduced foldability, an increased weight, an increased bulkiness when folded, which leads to a reduced mountability, and increased costs.

In addition, when the heat-resistance increasing fabric sheet is constituted only by aluminum foil, the strength of the heat-resistance increasing fabric sheet such as the tensile strength and the tear strength will be insufficient. Therefore, when the airbag 22 is deployed and inflated, the aluminum foil itself will scatter due to the inflation gas pressure. This also applies to a case in which a thick aluminum foil is used or a case in which a heat-resistance increasing fabric sheet is constituted by laminating only the top coat layer 29 on the aluminum foil. However, the base fabric sheet 27 compensates for such insufficient strength, thereby preventing the aluminum foil from scattering due to the pressure of the inflation gas.

In particular, since the plain-woven fabric is woven by alternately crisscrossing the warp threads 27a and the weft threads 27b, there are a greater number of intersections between the warp threads 27a and the weft threads 27b than fabrics woven by other types of weaves such as twill weave and satin weave. Therefore, the strengths such as tensile strength and tear strength in plain-woven fabric are higher than those of other weave structures. Also, the plain-woven fabric has a small difference in strength between the arrangement direction of the warp threads 27a and the arrangement direction of the weft threads 27b. Thus, the effect of the base fabric sheet 27 in compensating for the insufficient strength of the aluminum foil is achieved to a similar extent both in the arrangement direction of the warp threads 27a and in the arrangement direction of the weft threads 27b.

The heat-resistant layer 28, which is made of aluminum foil, is laminated on the base fabric sheet 27, which is made of cotton fibers. Therefore, due to the anchor effect, the heat-resistant layer 28 is mechanically coupled to the base fabric sheet 27 and firmly adheres to the base fabric sheet 27. This configuration prevents the heat-resistant layer 28 from peeling from the base fabric sheet 27 and the heat-resistant layer 28 from scattering due to the pressure of the inflation gas when the airbag 22 is deployed and inflated.

As the plain-woven fabric, the one with the following tensile strengths is used: at least 400 newtons in the arrangement direction of the warp threads 27a when a test piece having a width of 3 cm is used, and at least 400 newtons in the arrangement direction of the weft threads 27b when a test piece having a width of 3 cm is used. These conditions are generally required for the main body fabric portion 23 as a member subjected to an increase in heat resistance that is made of polyamide fiber, polyester fiber, or the like. Thus, being made of the plain-woven fabric having the strength satisfying the above conditions, the base fabric sheet 27 effectively exerts the function of compensating for the insufficient strength of the aluminum foil. Therefore, when the airbag 22 is deployed and inflated, the aluminum foil is effectively prevented from scattering by the inflation gas. In addition, the aluminum foil firmly adheres to the base fabric sheet 27, so that the aluminum foil is effectively prevented from peeling from the base fabric sheet 27. Also, in order to satisfy the above conditions, the base fabric sheet 27 is woven with a high density. This is expected to achieve the effect of restricting the inflation gas from passing through the base fabric sheet 27 and contacting the main body fabric portion 23.

In addition to the ones listed above, the first embodiment achieves the following advantages.

As a fabric used as the heat-resistance increasing fabric sheet, a silicone coated fabric is also known. The silicone coated fabric is a fabric made of polyamide fiber, polyester fiber, or the like in which the surface to be brought into contact with inflation gas is coated with silicone resin resistant to the heat of inflation gas. To produce the silicone coated fabric, it is necessary to coat a non-coated fabric with a silicone resin after the refining step. Moreover, the silicone resin itself has high material costs. Also, a large-scale coating facility is required to apply silicone resin with a constant film thickness to fabric. This increases the costs from the viewpoint of the coating process costs and the equipment depreciation. Thus, the costs of the silicone coated fabric will be increased, raising the costs of the airbag.

In contrast, in the first embodiment, the heat-resistance increasing fabric sheet 26 is made of aluminum foil, cotton plain-woven fabric, and a plastic film. These materials are not special materials but are circulated in the market in quantities, and are inexpensive and easy to obtain. Therefore, the material costs can be kept low.

In addition, as described above, the heat-resistance increasing fabric sheet 26 of the three-layer structure is formed by laminating aluminum foil on a plain-woven fabric and laminating a plastic film on the aluminum foil. Therefore, the manufacturing costs are reduced as compared with the case in which fabric is coated with silicone resin.

Second Embodiment

A second embodiment, in which a heat-resistance increasing fabric sheet is used in a side airbag apparatus 40, will be described with reference to FIGS. 3 to 5.

In the following description, the direction in which the vehicle advances will be referred to as the front, and the reverse direction will be referred to as the rear. The center in the width direction of the vehicle (the vehicle width direction) is used as a reference. The side closer to the center in the vehicle width direction will be referred to as the inner side of the vehicle, while the side farther from the center in the vehicle width direction will be referred to as the outer side of the vehicle. It is now assumed that an occupant having a size equivalent to a crash test dummy is seated in a predetermined normal posture in the vehicle seat.

Figure 3:
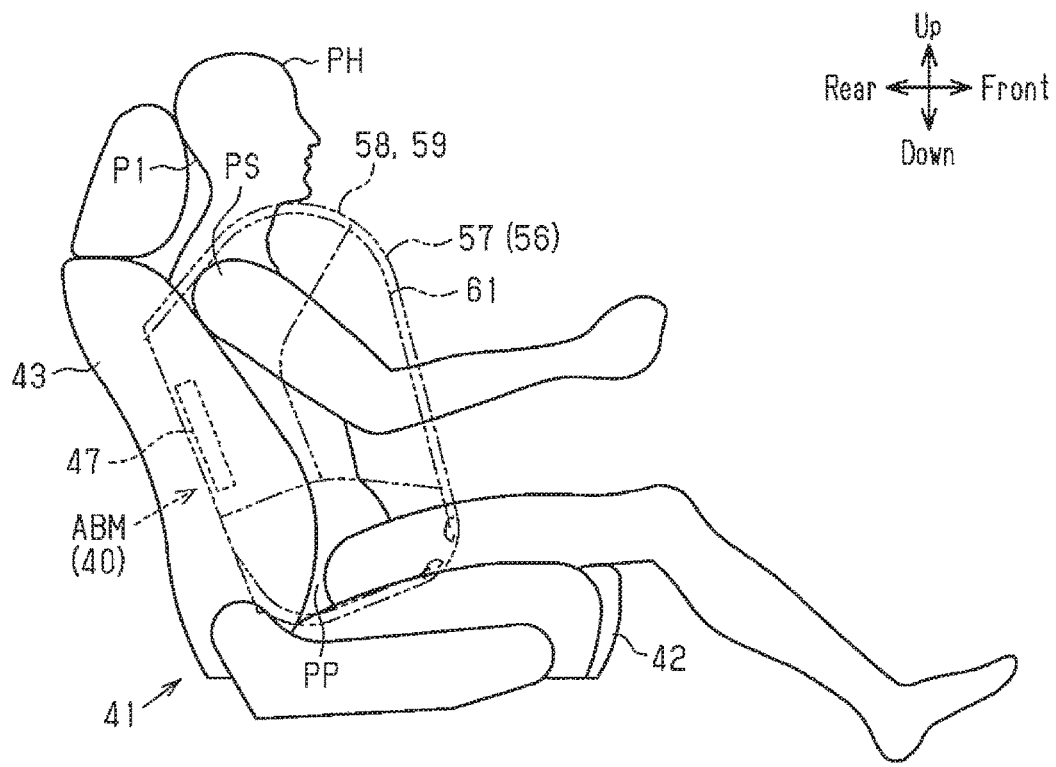
FIG. 3 is a diagram showing a second embodiment, in which a heat-resistance increasing fabric sheet is used in a side airbag apparatus, illustrating a side view of the vehicle seat in which the apparatus is installed, together with an occupant.

As shown in FIG. 3, the side airbag apparatus 40 deploys and inflates an airbag 56 on the side of the occupant P1 when an impact is applied or predicted to be applied to the vehicle from the side due to a side collision, thereby protecting the occupant P1 from the impact.

The vehicle has a vehicle seat 41 arranged in the vicinity of the inner side of the side wall. The side wall refers to a vehicle component that is located in the side of the vehicle, and mainly corresponds to a door and a pillar. A part of the side wall that corresponds to the front seat includes the front door and the center pillar. A part of the side wall that corresponds to the rear seat includes the rear part of the rear door, the rear pillar, the front part of the wheel well, and the rear quarter.

The vehicle seat 41 includes a seat cushion 42 and a seat back 43. The seat cushion 42 is secured to the floor of the vehicle body. The seat back 43 is located above the rear portion of the seat cushion 42, and is inclined rearward. The seat back 43 incorporates a seat frame, which constitutes the framework of the seat back 43. Part of the seat frame is configured by a side frame portion 44, which is located in the outer-side portion of the seat back 43 as shown in FIGS. 4 and 5.

A storage portion 46 is provided in a portion of the seat back 43 adjacent to and on the outer side of the side frame portion 44. The storage portion 46 accommodates an airbag module ABM, which constitutes the main part of the side airbag apparatus 40. The airbag module ABM is attached to the side frame portion 44. The airbag module ABM includes as its components a gas generator 47, an airbag 56, and a heat-resistance increasing fabric sheet 63. Each of these components will now be described.

<Gas Generator 47>

The gas generator 47 is composed of a gas generator main body 48, which is the main part of the gas generator 47, and two bolts 55 for attaching the gas generator main body 48 to the side frame portion 44 together with the airbag 56 and the heat-resistance increasing fabric sheet 63.

The gas generator main body 48 includes an inflator 49 and a retainer 54, which surrounds the inflator 49. The gas generator main body 48 has an elongated shape extending substantially in the vertical direction. In the second embodiment, an inflator of the cylinder type is used as the inflator 49. The inflator 49 is substantially columnar and accommodates a gas generating agent (not shown), which generates inflation gas. The inflator 49 has a gas outlet portion 51 at the lower end. The gas outlet portion 51 has gas discharging holes 51a for discharging inflation gas outward in the radial direction. A harness 52 for delivering activation signals to the inflator 49 is connected to the upper end of the inflator 49 via a connector 53.

The retainer 54 constitutes the outer peripheral portion of the gas generator main body 48. The retainer 54 functions as a diffuser for controlling the directions of discharged inflation gas and also serves to attach the inflator 49 together with the airbag 56 to the side frame portion 44. Most of the retainer 54 is formed by bending a plate such as a metal plate into a substantially cylindrical shape. The retainer 54 is secured to the upper end of the inflator 49 by swaging the upper end of the retainer 54 such that its diameter is reduced. The lower end of the retainer 54 is located at a position lower than the lower end of the gas outlet portion 51 of the inflator 49.

The two bolts 55 protrude toward the inner side from two positions spaced apart from each other in the vertical direction of the retainer 54.

The gas generator main body 48 may be configured by integrating the inflator 49 and the retainer 54. The gas generator main body 48 may be constituted only by the inflator 49. In this case, the bolts 55 are fixed directly to the inflator 49.

<Airbag 56>

The airbag 56 being spread in a planar form without being filled with inflation gas is represented by a long dashed double-short dashed line in FIG. 3. The airbag 56 being folded into a compact form is represented by a long dashed double-short dashed line in FIG. 4. As shown in FIGS. 3 and 4, the outer shape of the airbag 56 is formed by a main body fabric portion 57. The main body fabric portion 57 is made of the same material as that of the main body fabric portion 23 of the first embodiment. The main body fabric portion 57 is formed by joining two fabric portions 58, 59 superposed in the vehicle width direction to each other. The fabric portions 58, 59 are joined at a peripheral joint portion 61 provided in the periphery of the fabric portions 58, 59. The peripheral joint portion 61 is formed by sewing in the second embodiment, but it may be formed by other means, for example, bonding.

The airbag 56 is deployed and inflated by the inflation gas supplied to the airbag 56. The shape and the size of the airbag 56 are determined such that the airbag 56 can protect most part of the upper body of the occupant P1, for example, the region including the lumbar region PP and the shoulder region PS, when the airbag 56 is deployed and inflated between the vehicle seat 41 and the side wall.

The main body fabric portion 57 has an insertion port (not shown) for the gas generator 47 at the rear end. Also, the main body fabric portion 57 has partitioning portions for dividing the interior of the main body fabric portion 57 into multiple chambers (inflation chambers) and flow-regulating portions for regulating the flow of inflation gas. The partitioning portions and the flow-regulating portions are some of the components of the airbag 56. The partitioning portions and the flow-regulating portions are also made of the same material as that of the main body fabric portion 23 of the first embodiment.

Figure 4:
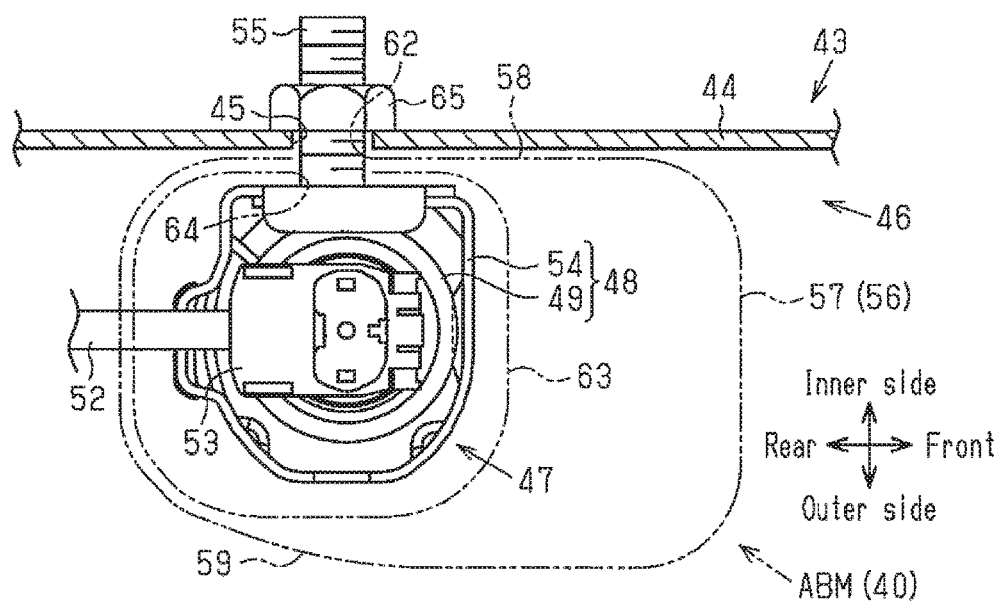
FIG. 4 is a partial horizontal cross-sectional view showing a state in which the airbag module is attached to the side frame portion in the second embodiment.
Figure 5:
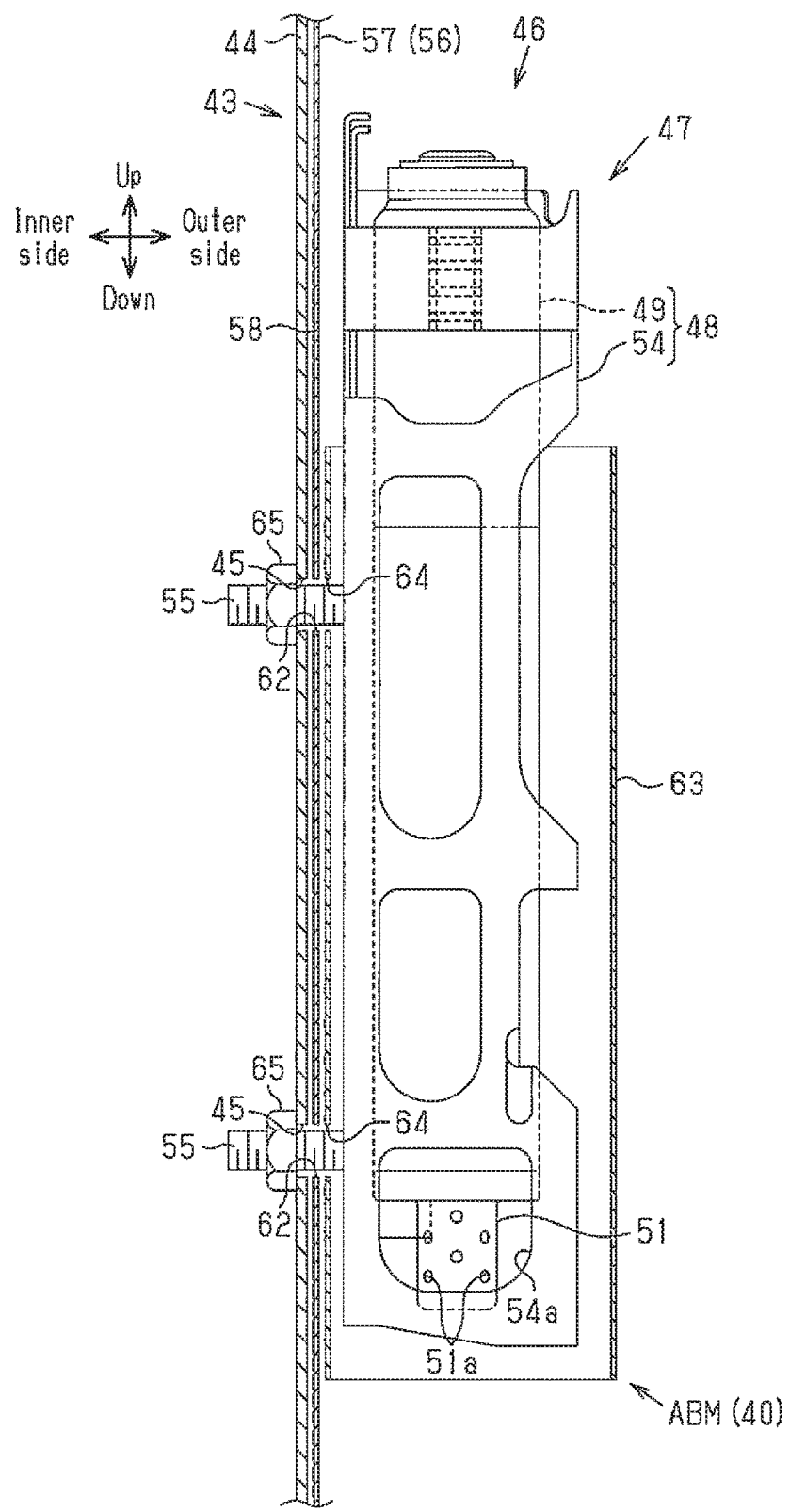
FIG. 5 is a partial vertical cross-sectional view showing a state in which the airbag module is attached to the side frame portion in the second embodiment.

As shown in FIGS. 4 and 5, the inner-side fabric portion 58 has insertion holes 62 for receiving the bolts 55 in the rear end at two positions spaced apart from each other in the vertical direction.

<Heat-Resistance Increasing Fabric Sheet 63>

Some of the members constituting the airbag 56 are brought into contact with the inflation gas discharged from the gas outlet portion 51 and are referred to as direct injection gas contacting members. The heat-resistance increasing fabric sheet 63 is used to increase the heat resistance of the main body fabric portion 57, which is one of the direct injection gas contacting members. That is, in the second embodiment, the main body fabric portion 57, which is one of the direct injection gas contacting members, is defined as a member subjected to an increase in heat resistance by the heat-resistance increasing fabric sheet 63.

Figure 2:
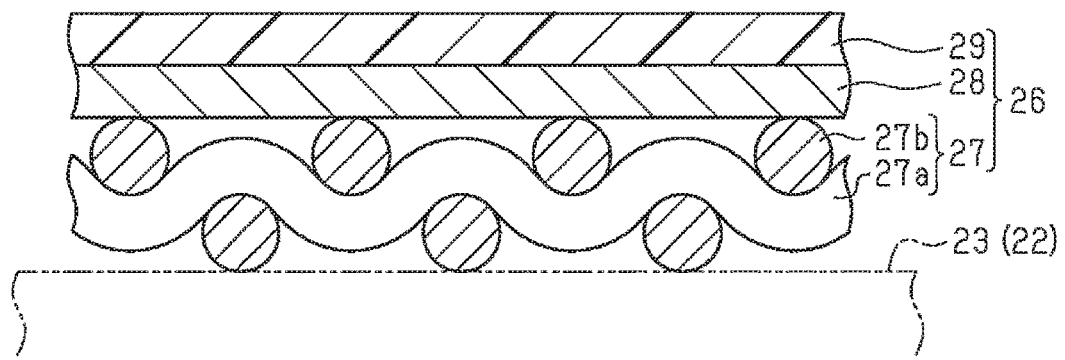
FIG. 2 is an enlarged cross-sectional view showing a part of the heat-resistance increasing fabric sheet of the first embodiment.

Although not illustrated, the heat-resistance increasing fabric sheet 63 has a three-layer structure composed of a base fabric sheet made of cotton fibers, a heat-resistant layer made of aluminum foil, and a top coat layer made of a plastic film as in the first embodiment (see FIG. 2).

The heat-resistance increasing fabric sheet 63 is indicated by a long dashed double-short dashed line in FIG. 4. The heat-resistance increasing fabric sheet 63 is formed into a cylindrical shape with the upper and lower ends open such that the top coat layer is positioned on the inner peripheral side and the base fabric sheet is positioned on the outer peripheral side. The heat-resistance increasing fabric sheet 63 is arranged about the retainer 54 to surround at least the gas outlet portion 51 of the inflator 49. Part of the heat-resistance increasing fabric sheet 63 is located between the main body fabric portion 57 and the gas outlet portion 51. The lower end of the heat-resistance increasing fabric sheet 63 is located below the lower end of the gas outlet portion 51. The upper end of the heat-resistance increasing fabric sheet 63 is located above the upper bolt 55. The heat-resistance increasing fabric sheet 63 has insertion holes 64 for receiving the bolts 55 at two positions spaced apart from each other in the vertical direction. The heat-resistance increasing fabric sheet 63 is secured to the gas generator 47 by inserting the bolts 55 into these insertion holes 64.

The gas generator 47 and the heat-resistance increasing fabric sheet 63 are inserted into the rear end of the main body fabric portion 57 through the insertion port and inclined rearward such that the gas outlet portion 51 is located at the lower end of the inflator 49 (see FIG. 3).

Each bolt 55, which protrudes from the retainer 54 and is inserted through the corresponding insertion hole 64 of the heat-resistance increasing fabric sheet 63, is inserted through the corresponding insertion hole 62 of the inner-side fabric portion 58. The insertion secures the gas generator 47 and the heat-resistance increasing fabric sheet 63 to the main body fabric portion 57 with the positions determined with respect to the main body fabric portion 57.

The airbag 56 is made compact as indicated by a long dashed double-short dashed line in FIG. 4 by folding the part forward of the generator main body 48. The airbag 56 is folded in this manner to be suitably stored in the storage portion 46, which has a limited size in the seat back 43. The airbag 56 is held in a folded form by a binding tape (not shown).

The airbag module ABM, in which the airbag 56 is held in a form suitable for storage, is arranged in the storage portion 46. The two bolts 55 are inserted into two insertion holes 45 provided in the side frame portion 44 from the outer side. The gas generator 47 and the heat-resistance increasing fabric sheet 63 are attached to the side frame portion 44 together with the airbag 56 by fastening nuts 65 to the bolts 55 from the inner side.

Operation and advantages of the second embodiment, which is configured as described above, will now be described.

In the side airbag apparatus 40, inflation gas is not discharged from the gas outlet portion 51 of the inflator 49 at the normal time when no impact is applied to the side wall of the vehicle from the side due to a side collision. Therefore, the airbag 22 remains accommodated in the storage portion 46 in the folded form together with the gas generator 47 and the heat-resistance increasing fabric sheet 63.

At this time, in the heat-resistance increasing fabric sheet 63, the top coat layer restricts the heat-resistant layer from easily contacting oxygen. Further, the top coat layer restricts the heat-resistant layer from contacting circumjacent components made of a metal material different from aluminum, for example, the retainer 54 and the bolts 55, in a situation in which moisture (including moisture in the air) is present. Thus, it is possible to suppress aging deterioration due to oxidation and electrolytic corrosion of the heat-resistant layer at a normal time before the side airbag apparatus 40 is activated.

In contrast, when an impact is applied or predicted to be applied to the side wall from the side or the like due to a side collision or the like during traveling of the vehicle, the inflator 49 discharges inflation gas radially outward from the gas outlet portion 51. Some of the inflation gas passes through a hole 54a provided at the lower end of the retainer 54 and strikes the heat-resistance increasing fabric sheet 63. The inflation gas is restricted from directly striking parts of the main body fabric portion 57 about the gas outlet portion 51 by the heat-resistance increasing fabric sheet 63. Further, in a case in which the partitioning portions and the flow-regulating portions are arranged near the gas outlet portion 51, the heat-resistance increasing fabric sheet 63 restricts the inflation gas from directly striking the partitioning portions or the flow-regulating portions.

The inflation gas is supplied to the main body fabric portion 57, so that the airbag 56 starts being inflated. The airbag 56 is projected forward from the seat back 43 with part thereof (a rear portion) remaining in the storage portion 46 together with the gas generator 47 and the heat-resistance increasing fabric sheet 63.

The airbag 56, which continues being supplied with inflation gas, is inflated (deployed) while being unfolded forward between the side wall and the upper body of the occupant P1 seated in the vehicle seat 41 as indicated by a long dashed double-short dashed line in FIG. 3.

The thusly deployed and inflated airbag 56 is located between the upper body of the occupant P1 and the side wall, which is bulging into the passenger compartment due to the impact. The airbag 56 pushes the upper body toward the inner side and restrains the upper body. The side impact transmitted to the upper body through the side wall is reduced by the airbag 56 and the upper body is protected.

The aluminum foil, which constitutes the heat-resistant layer, exerts the heat resistance and restricts the high-temperature inflation gas from passing therethrough and directly contacting the base fabric sheet. In addition, the cotton fibers, which constitute the base fabric sheet, resists carbonization by the heat of the inflation gas, and holes are unlikely to be formed in the base fabric sheet.

Thus, the heat of the inflation gas is unlikely to be transferred to the main body fabric portion 57. Also, the heat of the inflation gas is unlikely to be transferred to the partitioning portions and the flow-regulating portions located near the gas outlet portion 51. The configuration thus restricts the inflation gas from carbonizing the parts of the main body fabric portion 57, the partitioning portions, and the flow-regulating portions about the gas outlet portion 51, so that no holes will be formed due to scattering carbonized parts. In addition, the number of the heat-resistance increasing fabric sheets 63 used for ensuring the heat resistance can be reduced. This resolves the problems of the airbag 56 such as a reduced foldability, an increased weight, an increased bulkiness when folded, which leads to a reduced mountability, and increased costs.

In addition, when the heat-resistance increasing fabric sheet 63 is constituted only by aluminum foil, the strength of the heat-resistance increasing fabric sheet 63 such as the tensile strength and the tear strength will be insufficient. However, the base fabric sheet compensates for the insufficient strength, thereby preventing the aluminum foil scattering due to the pressure of the inflation gas. In addition, the heat-resistant layer firmly adheres to the base fabric sheet due to the anchor effect. Thus, when the airbag 56 is deployed and inflated, the heat-resistant layer is restricted from peeling from the base fabric sheet, thereby preventing the heat-resistance layer from scattering due to the pressure of the inflation gas.

In addition to the above-described advantages, the second embodiment achieves advantages similar to those described in the first embodiment.

Third Embodiment

A third embodiment, in which a heat-resistance increasing fabric sheet 95 is used in a curtain airbag apparatus 70, will be described with reference to FIGS. 6 to 8.

The directions in the following description are the same as those in the second embodiment. In addition, the present embodiment is similar to the second embodiment in that an occupant having a size equivalent to a crash test dummy is seated in a predetermined normal posture in the vehicle seat.

Figure 6:
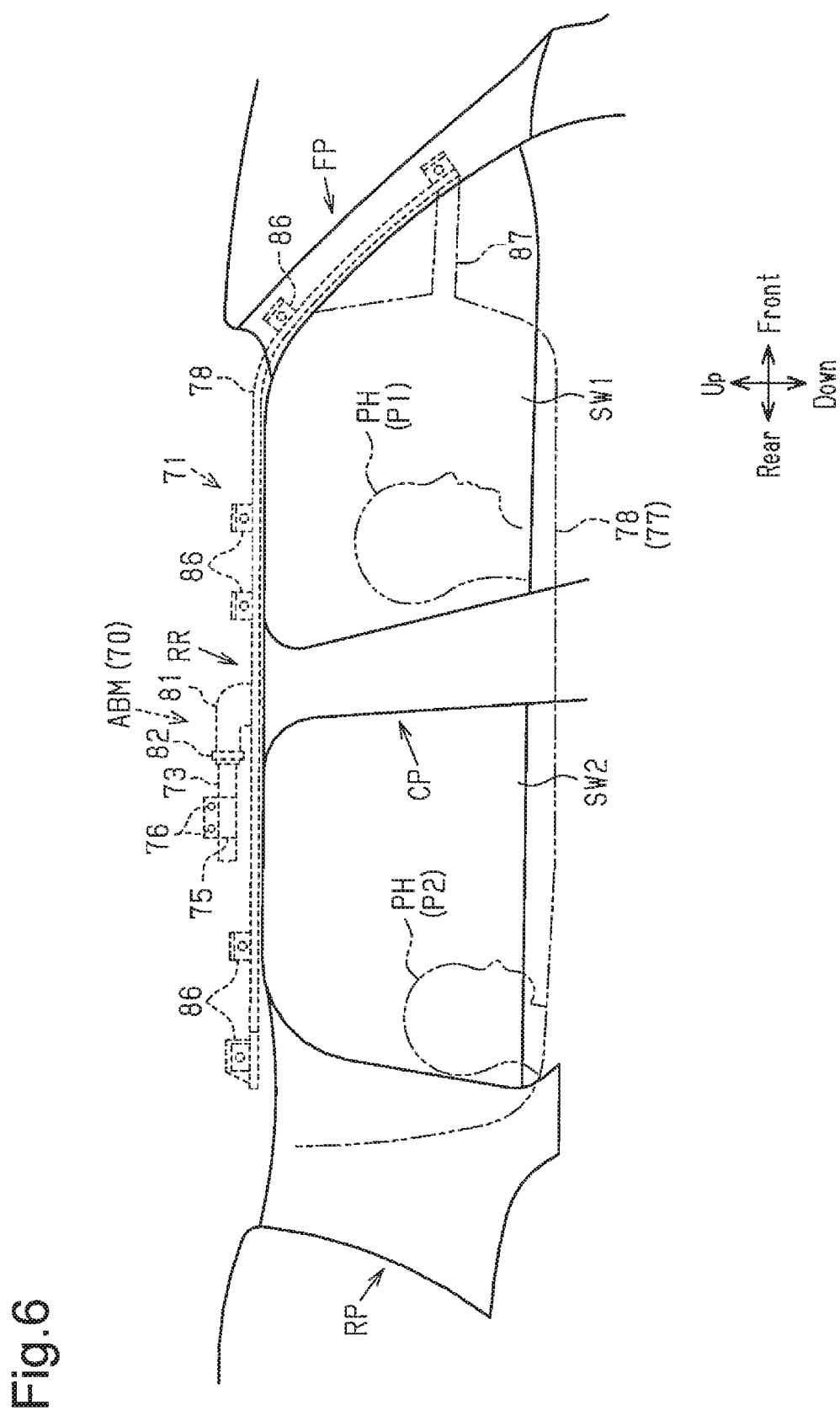
FIG. 6 is a diagram showing a third embodiment, in which a heat-resistance increasing fabric sheet is used in a curtain airbag apparatus, illustrating a schematic front view of a part of a vehicle in which the apparatus is installed.

As shown in FIG. 6, the curtain airbag apparatus 70 deploys and inflates an airbag 77 between the occupants P1, P2 and the side windows SW1, SW2 when an impact is applied to the vehicle from the side due to a side collision, thereby protecting the heads PH of the occupants P1, P2 from the impact.

Figure 7:
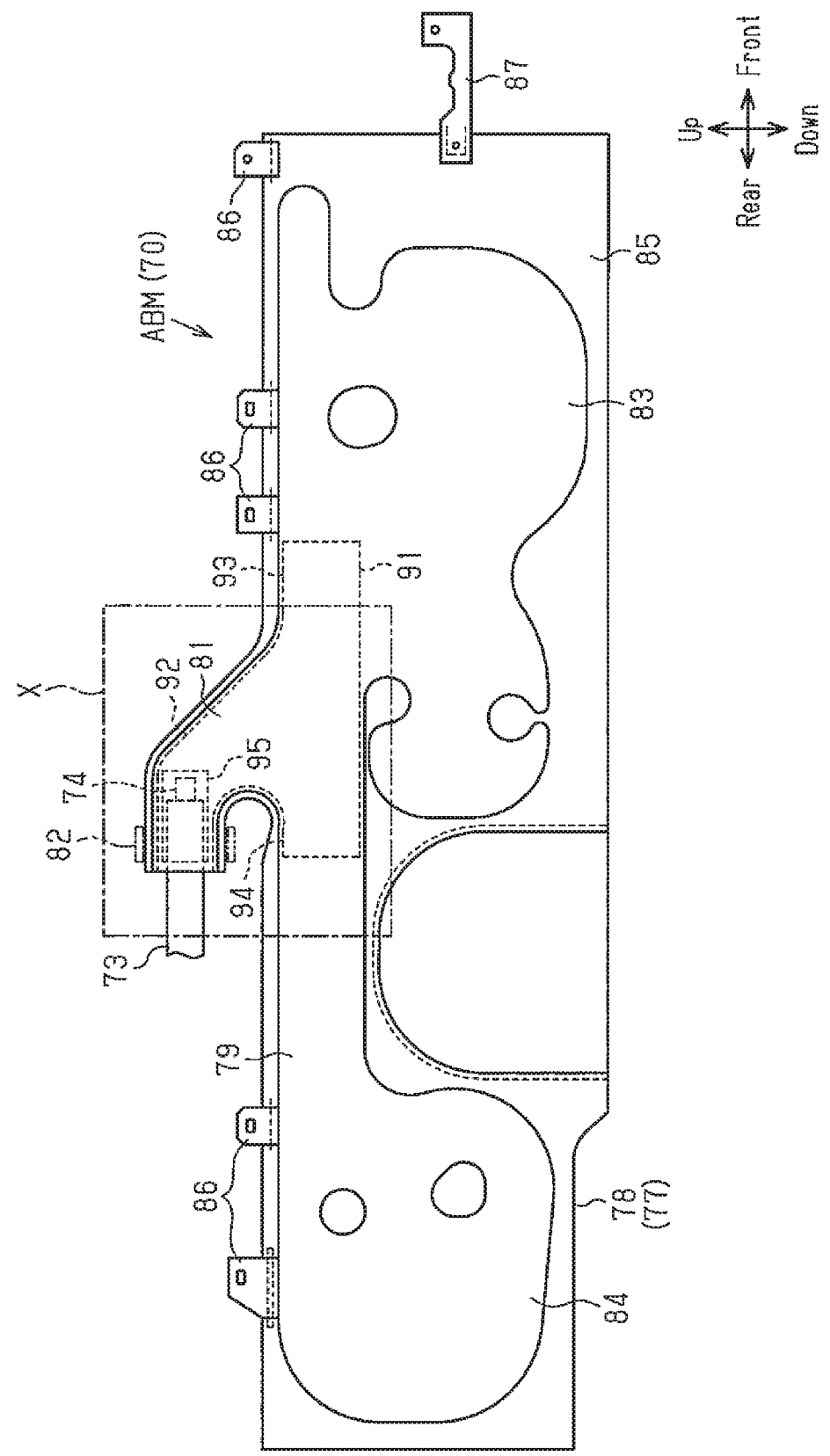
FIG. 7 is a partial front view of the airbag module of the third embodiment.
Figure 8:
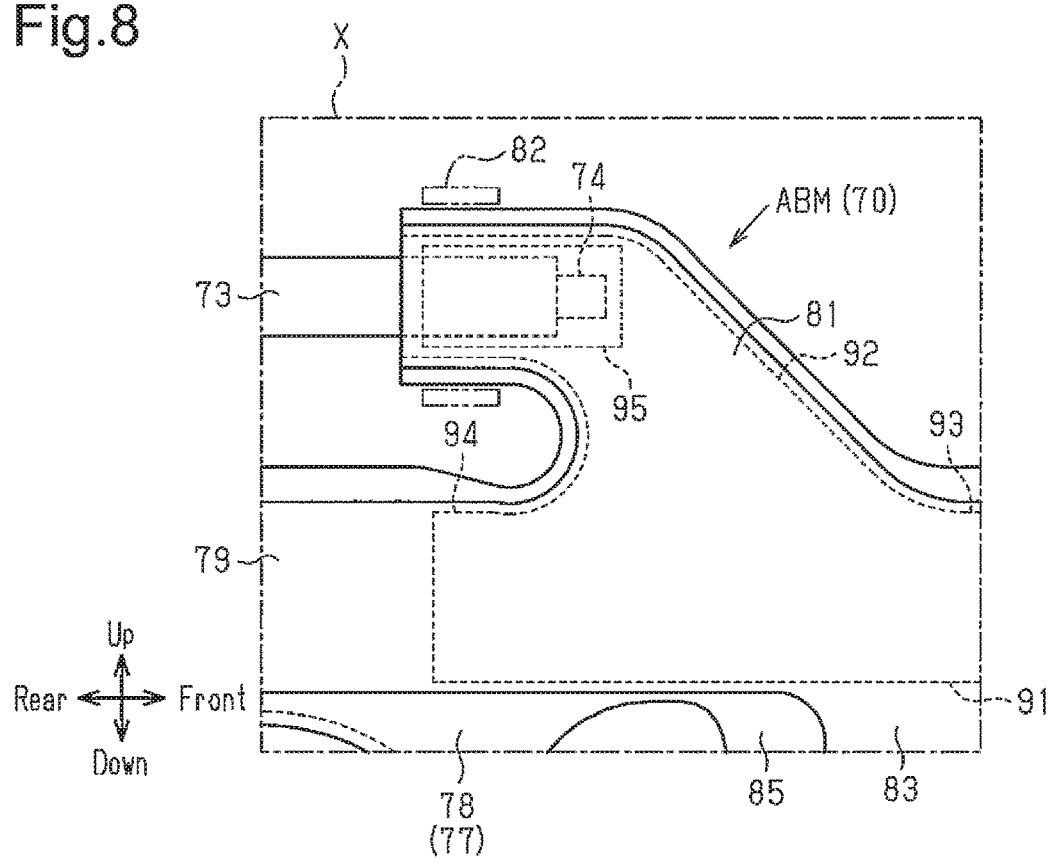
FIG. 8 is an enlarged partial front view showing section X in FIG. 7.

As shown in FIGS. 6 and 7, the main part of the curtain airbag apparatus 70 is constituted by an airbag module ABM. The airbag module ABM includes a gas generator, the airbag 77, and the heat-resistance increasing fabric sheet 95. The airbag module ABM is stored in a storage portion 71 and attached to the vehicle body. With respect to the vertical direction, the storage portion 71 is located above and in the vicinity of the side windows SW1, SW2. With respect to the front-rear direction, the storage portion 71 is located in the region from the front pillar FP to the vicinity of the rear pillar RP via the roof side rail RR.

The components constituting the airbag module ABM will now be described.

<Gas Generator>

The gas generator is constituted by an inflator 73 of a cylinder type. Unlike the second embodiment, no retainer is used as a component of the gas generator in the third embodiment. As in the second embodiment, the inflator 73, which has a substantially columnar shape, accommodates a gas generating agent (not shown), which generates inflation gas. The inflator 73 is arranged in the storage portion 71 in a position extending in the front-rear direction. The inflator 73 has a gas outlet portion 74 at the front end. The gas outlet portion 74 has gas discharging holes (not shown) for discharging inflation gas outward in the radial direction. A harness (not shown) for delivering activation signals to the inflator 73 is connected to the rear end of the inflator 73. The inflator 73 is attached to the ceiling portion of the vehicle body with a bracket 75 and bolts 76.

<Airbag 77>

FIG. 7 shows the airbag 77 being spread in a planar form without being filled with inflation gas. As shown in FIGS. 6 and 7, the outer shape of the airbag 77 is formed by a main body fabric portion 78. The main body fabric portion 78 is made of the same material as that of the main body fabric portion 23 of the first embodiment. The main body fabric portion 78 is formed such that the outer shape thereof is a horizontally elongated rectangular shape extending in the front-rear direction. The main body fabric portion 78 has a shape and size capable of covering the side windows SW1, SW2 and the front side portion of the rear pillar RP from the inner side. As shown in FIGS. 7 and 8, the main body fabric portion 78 includes a gas supply passage 79, a gas introduction portion 81, a front chamber 83, and a rear chamber 84.

The gas supply passage 79 linearly extends in the front-rear direction in the upper part of the main body fabric portion 78.

The gas introduction portion 81 is located above the gas supply passage 79. The lower end of the gas introduction portion 81 is connected to and communicates with the substantially central part of the gas supply passage 79 in the front-rear direction. As shown in FIG. 6, when the airbag module ABM is attached to the vehicle body, the gas introduction portion 81 is located above the center pillar CP. The rear end of the gas introduction portion 81 is open.

As shown in FIGS. 6 and 7, the front chamber 83 and the rear chamber 84 are located below the gas supply passage 79. The front chamber 83 communicates with the front portion of the gas supply passage 79, and is deployed and inflated in the head protection area of the occupant P1 in the front seat. The rear chamber 84 communicates with the rear portion of the gas supply passage 79, and is deployed and inflated in the head protection area of the occupant P2 in the rear seat.

In the main body fabric portion 78, the parts other than the gas supply passage 79, the gas introduction portion 81, the front chamber 83, and the rear chamber 84 constitute a non-inflatable portion 85, which is neither supplied with inflation gas nor inflated.

Attachment pieces 86 are joined to the upper end of the main body fabric portion 78 at positions separated in the front-rear direction. The airbag module ABM is attached to the vehicle body with these attachment pieces 86.

The rear end of the strap-shaped tension belt 87 is attached to the front end of the main body fabric portion 78. The tension belt 87 extends forward from the front end of the main body fabric portion 78. The tension belt 87 is attached to the front pillar FP at its front end.

The airbag 77 further includes an inner tube 91. As shown in FIGS. 7 and 8, the inner tube 91 has an inlet portion 92, a front outflow portion 93, and a rear outflow portion 94 and is made of the same material as the main body fabric portions 23, 57, 78. The inlet portion 92 has a cylindrical shape and is arranged in the gas introduction portion 81. The rear end of the inlet portion 92 is open. The front outflow portion 93 has a tubular shape and extends forward in the gas supply passage 79 from the lower end of the inlet portion 92. The rear outflow portion 94 has a tubular shape and extends rearward in the gas supply passage 79 from the lower end of the inlet portion 92. The front end of the front outflow portion 93 and the rear end of the rear outflow portion 94 are both open.

The front portion including the gas outlet portion 74 of the inflator 73 is inserted into the gas introduction portion 81 and the inlet portion 92 through the openings at the rear ends thereof. The gas introduction portion 81 and the inlet portion 92 are fastened to the inflator 73 by a clamp 82 attached around the rear end of the gas introduction portion 81.

<Heat-Resistance Increasing Fabric Sheet 95>

Some of the members constituting the airbag 77 are brought into contact with the inflation gas discharged from the gas outlet portion 74 and are referred to as direct injection gas contacting members. The heat-resistance increasing fabric sheet 95 is used to increase the heat resistance of the inner tube 91, which is one of the direct injection gas contacting members. That is, in the third embodiment, the inner tube 91, which is one of the direct injection gas contacting members, is defined as a member subjected to an increase in heat resistance by the heat-resistance increasing fabric sheet 95.

Although not illustrated, the heat-resistance increasing fabric sheet 95 has a three-layer structure composed of a base fabric sheet made of cotton fibers, a heat-resistant layer made of aluminum foil, and a top coat layer made of a plastic film as in the first embodiment (see FIG. 2).

The heat-resistance increasing fabric sheet 95 is formed into a cylindrical shape with the front and rear ends open such that the top coat layer is positioned on the inner peripheral side and the base fabric sheet is positioned on the outer peripheral side. The heat-resistance increasing fabric sheet 95 is arranged in the inlet portion 92 of the inner tube 91. More specifically, the heat-resistance increasing fabric sheet 95 is arranged between the gas outlet portion 74 and the inlet portion 92, while surrounding at least the gas outlet portion 74 of the inflator 73. The front end of the heat-resistance increasing fabric sheet 95 is located forward of the front end of the gas outlet portion 74. The rear end of the heat-resistance increasing fabric sheet 95 is located at the rear ends of the gas introduction portion 81 and the inlet portion 92. The heat-resistance increasing fabric sheet 95 is fastened to the inflator 73 together with the gas introduction portion 81 and the inlet portion 92 by the clamp 82.

The airbag module ABM configured as described above has an elongated shape by folding the main body fabric portion 78 as shown in FIG. 6 before being mounted on the vehicle. The main body fabric portion 78 is held in a folded form by a fastening member (not shown) such as a tape. As the fastening member, a component that can be broken when the airbag 77 is deployed and inflated is used.

Operation and advantages of the third embodiment, which is configured as described above, will now be described.

In the curtain airbag apparatus 70, inflation gas is not discharged from the gas outlet portion 74 of the inflator 73 at the normal time when no impact is applied to the side wall of the vehicle from the side due to a side collision. Therefore, the airbag 77 remains accommodated in the storage portion 71 in the folded form together with the inflator 73 and the heat-resistance increasing fabric sheet 95.

At this time, in the heat-resistance increasing fabric sheet 95, the top coat layer restricts the heat-resistant layer from easily contacting oxygen. Further, the top coat layer restricts the heat-resistant layer from contacting circumjacent components made of a metal material different from aluminum in a situation in which moisture (including moisture in the air) is present. Thus, it is possible to suppress aging deterioration due to oxidation and electrolytic corrosion of the heat-resistant layer at a normal time before the curtain airbag apparatus 70 is activated.

In contrast, when an impact is applied or predicted to be applied to the side wall from the side or the like due to a side collision or the like during traveling of the vehicle, the inflator 73 discharges inflation gas radially outward from the gas outlet portion 74. Some of the inflation gas strikes parts of the heat-resistance increasing fabric sheet 95 around the gas outlet portion 74. The inflation gas is restricted from directly striking parts of the inner tube 91 about the gas outlet portion 74 by the heat-resistance increasing fabric sheet 95.

After passing through the inlet portion 92 of the inner tube 91, the inflation gas is divided into a portion flowing through the front outflow portion 93 and a portion flowing through the rear outflow portion 94. The inflation gas flowing out from the front outflow portion 93 is supplied to the front chamber 83 by flowing forward through the gas supply passage 79. The inflation gas flowing out from the rear outflow portion 94 is supplied to the rear chamber 84 by flowing rearward through the gas supply passage 79. The supplied inflation gas initiates the inflation of the front chamber 83 and the rear chamber 84. The airbag 77 is projected downward from the storage portion 71 with part thereof remaining in the storage portion 71.

As shown in FIGS. 6 and 7, the airbag 77 is deployed and inflated into a curtain-shape from the storage portion 71 so as to cover the side windows SW1, SW2. The front chamber 83 is deployed and inflated between the head PH of the occupant P1 in the front seat and the front side window SW1 so as to protect the head PH of the occupant P1 from the impact. The rear chamber 84 is deployed and inflated between the head PH of the occupant P2 in the rear seat and the rear side window SW2 so as to protect the head PH of the occupant P2 from the impact.

The aluminum foil, which constitutes the heat-resistant layer, exerts the heat resistance and restricts the high-temperature inflation gas from passing therethrough and directly contacting the base fabric sheet. In addition, the cotton fibers, which constitute the base fabric sheet, resists carbonization by the heat of the inflation gas, and holes are unlikely to be formed in the base fabric sheet.

Thus, the heat of the inflation gas is unlikely to be transferred to the inlet portion 92 of the inner tube 91. This suppresses the phenomenon in which the parts of the inlet portion 92 about the gas outlet portion 74, in particular, the upper parts of the inlet portion 92 are carbonized and scattered to form holes. In addition, the number the heat-resistance increasing fabric sheets 95 used for ensuring the heat resistance can be reduced. This resolves the problems of the airbag 77 such as a reduced foldability, an increased weight, an increased bulkiness when folded, which leads to a reduced mountability into the narrow storage portion 71, and increased costs.

In addition, when the heat-resistance increasing fabric sheet is constituted only by aluminum foil, the strength of the heat-resistance increasing fabric sheet such as the tensile strength and the tear strength will be insufficient. However, the base fabric sheet compensates for the insufficient strength, thereby preventing the aluminum foil scattering due to the pressure of the inflation gas. In addition, the heat-resistant layer firmly adheres to the base fabric sheet due to the anchor effect. Thus, when the airbag 77 is deployed and inflated, the heat-resistant layer is restricted from peeling from the base fabric sheet. This prevents the heat-resistance layer from scattering due to the pressure of the inflation gas.

In addition to the above-described advantages, the third embodiment achieves advantages similar to those described in the first embodiment.

The above-described embodiments may be modified as follows.

Modification to First Embodiment

The heat-resistance increasing fabric sheet 26 can be used not only in the driver's seat airbag apparatus 10 but also in a front passenger seat airbag apparatus.

The front passenger seat airbag apparatus is incorporated in a part of the instrument panel in front of the front passenger seat. The front passenger seat airbag apparatus is designed to protect the occupant in the front passenger seat from an impact by deploying and inflating an airbag in front of the front passenger seat when an impact is applied to or predicted to be applied to the vehicle from the front due to a frontal collision. In the front passenger seat airbag apparatus, a disk-type inflator similar to that in the driver's seat airbag apparatus 10 is used.

Figure 14:
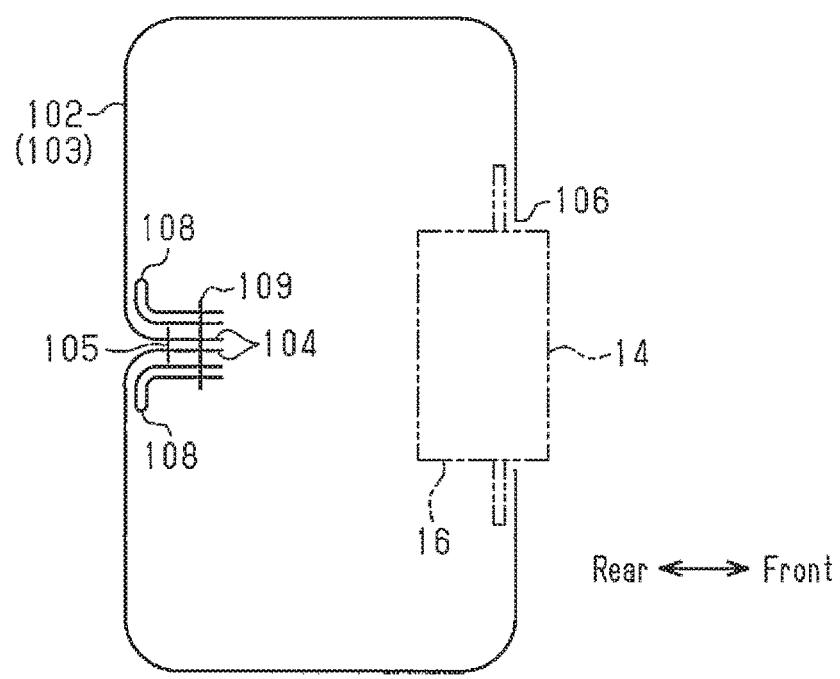
FIG. 14 is a diagram of a modification of the heat-resistance increasing fabric sheet in the first embodiment, illustrating a cross-sectional view of a flow-regulating fabric sheet to which the heat-resistance increasing fabric sheet is attached, together with the inflator.
Figure 15:
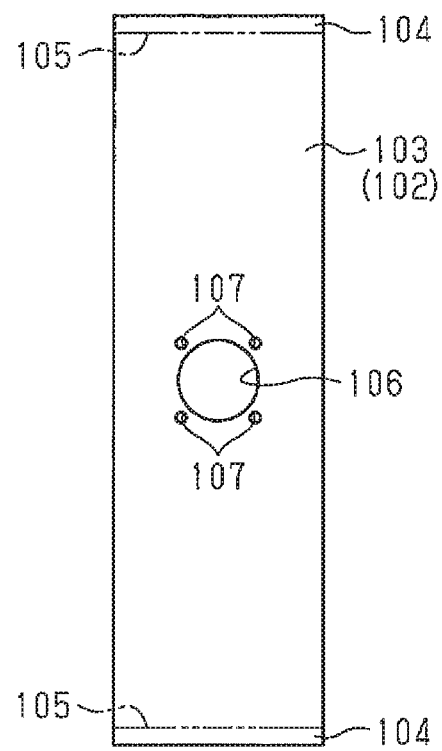
FIG. 15 is a developed view of the flow-regulating fabric sheet of FIG. 14.

A belt-shaped fabric sheet 103 may be formed into an annular shape as shown in FIGS. 14 and 15 to be used as a flow-regulating fabric sheet 102 (not shown in the first embodiment) for regulating the flow of inflation gas discharged from the gas outlet portion 16. The opposite ends 104 in the longitudinal direction of the fabric sheet 103 are superposed onto each other inside the flow-regulating fabric sheet 102. The opposite ends 104 are joined to each other by a sewn part 105 behind the gas outlet portion 16. The fabric sheet 103 has an insertion port 106 for inserting the gas outlet portion 16 in the middle section in the longitudinal direction. The fabric sheet 103 also has screw insertion holes 107 (not illustrated in FIG. 14) for receiving the attaching screws 35 of the ring retainer 33 at positions about the insertion port 106.

The inflation gas discharged from the gas outlet portion 16 contacts the sewn part 105. Thus, the sewn part 105 may be defined as a member subjected to an increase in heat resistance by a heat-resistance increasing fabric sheet. FIG. 14 shows a modification in which two heat-resistance increasing fabric sheets 108 are arranged between the gas outlet portion 16 and the sewn part 105. Each heat-resistance increasing fabric sheet 108 has a three-layer structure similar to the heat-resistance increasing fabric sheet 26. Each heat-resistance increasing fabric sheet 108 is belt-shaped and folded in half. Each heat-resistance increasing fabric sheet 108 does not need to be folded in half. The heat-resistance increasing fabric sheets 108 sandwich the ends 104 of the flow-regulating fabric sheet 102 (the fabric sheet 103) from the opposite sides in the thickness direction (the vertical direction in FIG. 14). The heat-resistance increasing fabric sheets 108 are joined to the ends 104 of the flow-regulating fabric sheet 102 (the fabric sheet 103) by a sewn part 109 located closer to the gas outlet portion 16 than the sewn part 105.

In this modification, some of the inflation gas discharged from the gas outlet portion 16 strikes both heat-resistance increasing fabric sheets 108. The inflation gas is restricted from directly striking the sewn part 105 by the heat-resistance increasing fabric sheets 108. Since the heat of the inflation gas is unlikely to be transferred to the sewn part 105, the sewn part 105 is prevented from being carbonized by the inflation gas, so that scattering of carbonized parts is suppressed.

Figure 16:
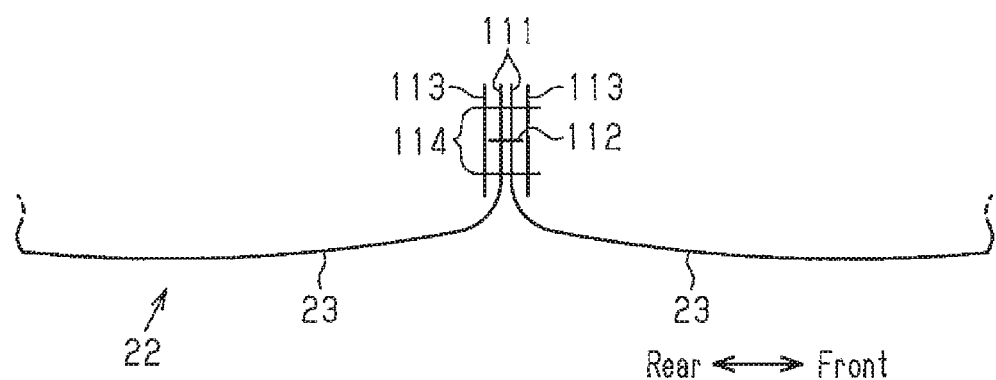
FIG. 16 is a diagram of a modification of the heat-resistance increasing fabric sheet in the first embodiment, illustrating a partial cross-sectional view of an airbag in which the heat-resistance increasing fabric sheet is attached to a sewn part.

As shown in FIG. 16, the outer shape of the airbag 22 may be constituted by a pair of main body fabric portions 23 arranged in the front-rear direction. The peripheries 111 of the main body fabric portions 23 may be superposed onto each other inside the airbag 22 and joined together by a sewn part 112.

The inflation gas discharged from the gas outlet portion 16 (refer to FIG. 1) contacts the sewn part 112. Thus, the sewn part 112 may be defined as a member subjected to an increase in heat resistance by a heat-resistance increasing fabric sheet. FIG. 16 shows a modification in which two heat-resistance increasing fabric sheets 113 are arranged between the gas outlet portion 16 and the sewn part 112. Each heat-resistance increasing fabric sheet 113 has a three-layer structure similar to the heat-resistance increasing fabric sheet 26. The heat-resistance increasing fabric sheets 113 sandwich the peripheries 111 of the main body fabric portions 23 from the opposite sides in the thickness direction (the lateral direction in FIG. 16). The heat-resistance increasing fabric sheets 113 are joined to the peripheries 111 by two sewn parts 114. At least a part of the sewn parts 114 is provided at a position closer to the gas outlet portion 16 than the sewn part 112. In FIG. 16, one of the two sewn parts 114 is provided closer to the gas outlet portion 16 than the sewn part 112, and the other sewn part 114 is farther from the gas outlet portion 16 than the sewn part 112.

In this modification, some of the inflation gas discharged from the gas outlet portion 16 strikes both the heat-resistance increasing fabric sheets 113. The inflation gas is restricted from directly striking the sewn part 112 by the heat-resistance increasing fabric sheets 113. Since the heat of the inflation gas is unlikely to be transferred to the sewn part 112, the sewn part 112 is prevented from being carbonized by the inflation gas, so that scattering of carbonized parts is suppressed.

Modification to Second Embodiment

The above-described heat-resistance increasing fabric sheet 63 can be used not only in the side airbag apparatus 40 but also in a knee airbag apparatus.

The knee airbag apparatus has an airbag stored in a storage portion provided in the instrument panel or the like of the vehicle. The knee airbag apparatus is designed to protect the knees of the occupant by deploying and inflating an airbag to restrict the knees from moving forward when an impact is applied to or predicted to be applied to the vehicle from the front due to a frontal collision. In the knee airbag apparatus, a cylinder type inflator similar to that in the side airbag apparatus 40 is used.

It is important that the heat-resistance increasing fabric sheet 63 is arranged between the gas outlet portion 51 and a part of the main body fabric portion 57 forming the outer shape of the airbag 56 that is susceptible to the heat of the inflation gas. The heat-resistance increasing fabric sheet 63 may be or does not necessarily need to be arranged between the gas outlet portion 51 and part of the main body fabric portion 57 that is not significantly susceptible to the heat of the inflation gas.

Figure 9:
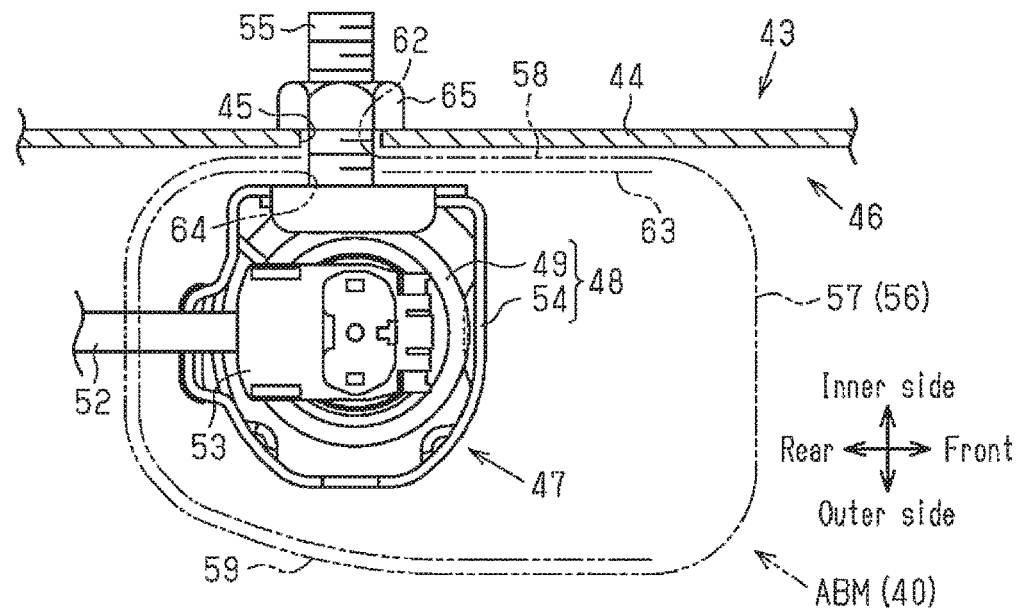
FIG. 9 is a diagram of a modification of the heat-resistance increasing fabric sheet in the second embodiment, illustrating a partial horizontal cross-sectional view corresponding to FIG. 4.

In the case of the side airbag apparatus 40, the heat-resistance increasing fabric sheet 63 may be arranged so as to surround the entire circumference of the retainer 54, or may be arranged so as to surround only part in the circumferential direction of the retainer 54. In a modification of FIG. 9, a heat-resistance increasing fabric sheet 63 is arranged between the main body fabric portion 57 and the gas outlet portion 51 so as not to surround the front portion of the retainer 54. According to this modification also, it is possible to prevent part of the main body fabric portion 57 about the gas outlet portion 51 from being affected by the heat of the inflation gas.

The heat-resistance increasing fabric sheet 63 may be shorter than that in the second embodiment. However, the upper end of the heat-resistance increasing fabric sheet 63 in FIG. 5 is preferably arranged at a position higher than the gas outlet portion 51 and the lower bolt 55. This is for securing the heat-resistance increasing fabric sheet 63 to the main body fabric portion 57 while making the heat of the inflation gas less likely to be transferred to the part of the main body fabric portion 57 about the gas outlet portion 51. For example, the upper end of the heat-resistance increasing fabric sheet 63 may be arranged between the bolts 55.

Figure 10:
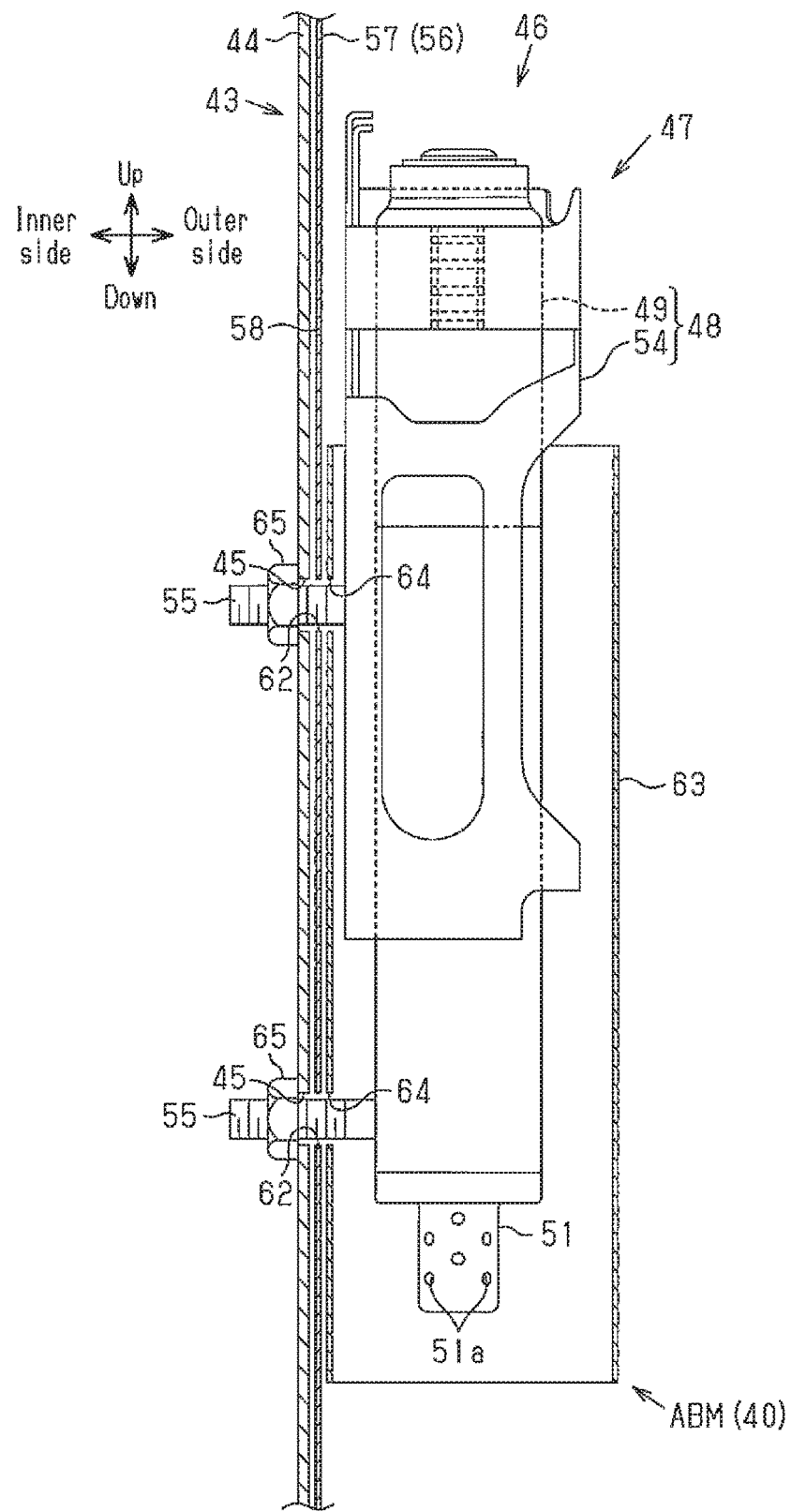
FIG. 10 is a diagram of a modification of the gas generator in the second embodiment, illustrating a partial vertical cross-sectional view corresponding to FIG. 5.

A retainer 54 shown in FIG. 10 may be used. The lower end of this retainer 54 is located at a position higher than the upper end of the gas outlet portion 51 and does not cover the gas outlet portion 51. The bolts 55 may be provided in both the retainer 54 and the inflator 49. In this case, some of the inflation gas discharged outward in the radial direction from the gas outlet portion 51 strikes the heat-resistance increasing fabric sheet 63 without passing through the retainer 54. The inflation gas is restricted from directly striking parts of the main body fabric portion 57 about the gas outlet portion 51 by the heat-resistance increasing fabric sheet 63. Further, in a case in which the partitioning portions and the flow-regulating portions are arranged near the gas outlet portion 51, the heat-resistance increasing fabric sheet 63 restricts the inflation gas from directly striking the partitioning portions or the flow-regulating portions.

Modification to Third Embodiment

For the same reasons as those described in the modification to the second embodiment, the arrangement of the heat-resistance increasing fabric sheet 95 may be changed in the curtain airbag apparatus 70. That is, the heat-resistance increasing fabric sheet 95 may be or does not necessarily need to be arranged between the gas outlet portion 74 and part of the inlet portion 92 in the inner tube 91 that is not significantly susceptible to the heat of the inflation gas. The heat-resistance increasing fabric sheet 95 may be arranged so as to surround only a part in the circumferential direction of the inflator 73. In a modification of FIG. 11, the heat-resistance increasing fabric sheet 95 is arranged not to surround the lower half of the gas outlet portion 74.

Figure 11:
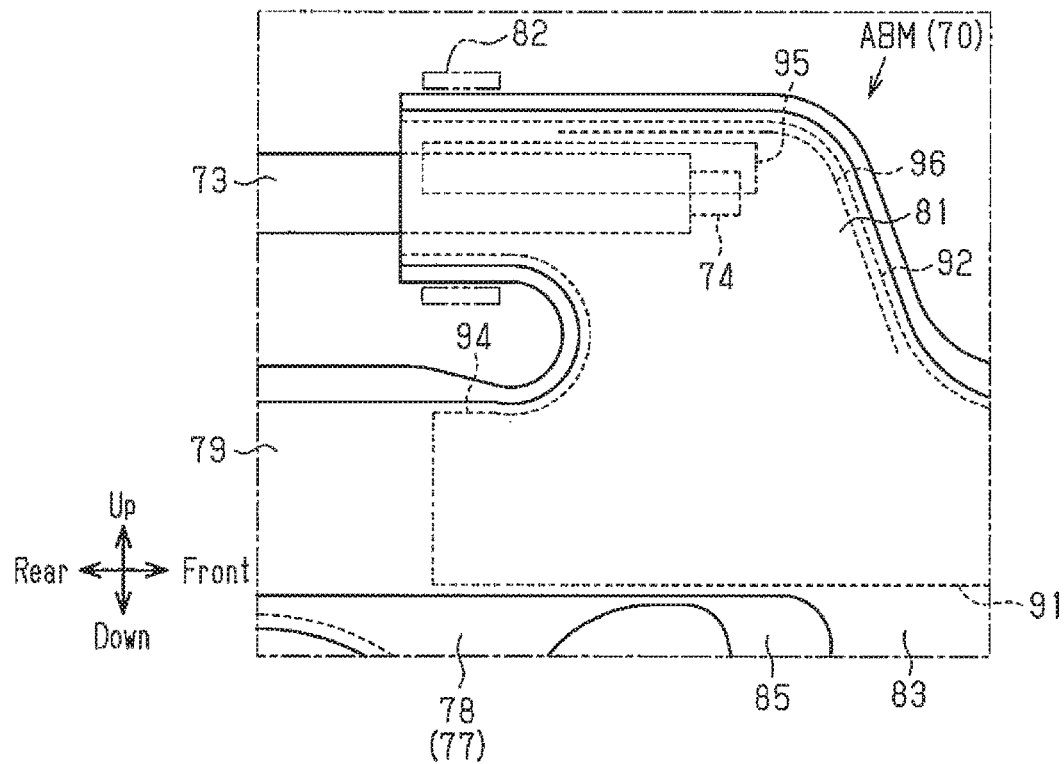
FIG. 11 is a diagram of a modification of the heat-resistance increasing fabric sheet in the third embodiment, illustrating a partial front view corresponding to FIG. 8.

Also, in the inlet portion 92, not only the part radially outward of the gas outlet portion 74 but also the part forward of the gas outlet portion 74 are susceptible to the heat of the inflation gas. Thus, the part of the inlet portion 92 that is forward of the gas outlet portion 74 may also be subject to carbonization due to heat. Therefore, as shown in FIG. 11, a heat-resistance increasing fabric sheet 96 that has a three-layer structure similar to that of the above-described heat-resistance increasing fabric sheet 95 may be arranged in the part of the inlet portion 92 that is forward of the gas outlet portion 74. This configuration prevents the front portion of the inlet portion 92 from being carbonized by the heat of the inflation gas.

Figure 12:
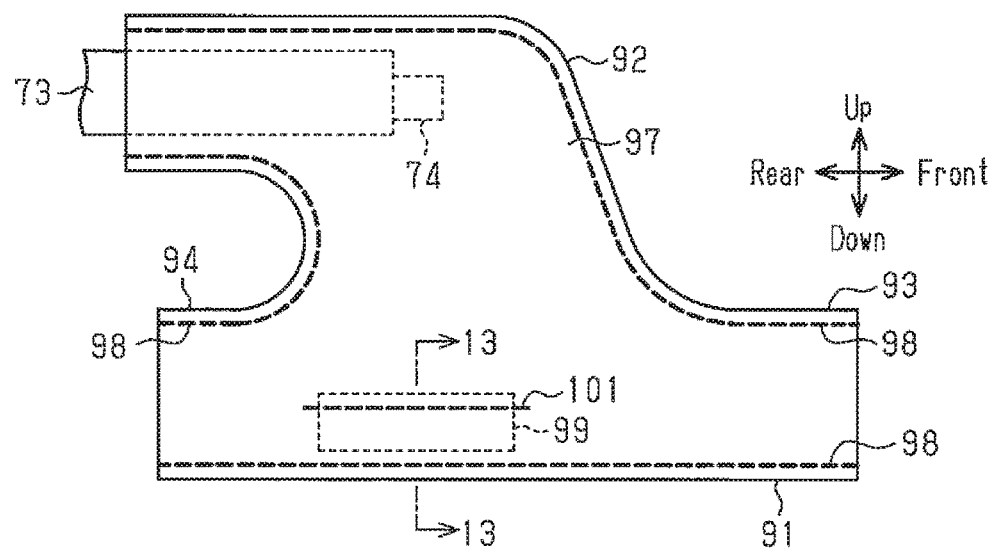
FIG. 12 is a diagram of a modification of the heat-resistance increasing fabric sheet in the third embodiment, illustrating a partial front view of an inner tube to which the heat-resistance increasing fabric sheet is attached, together with the inflator.
Figure 13:
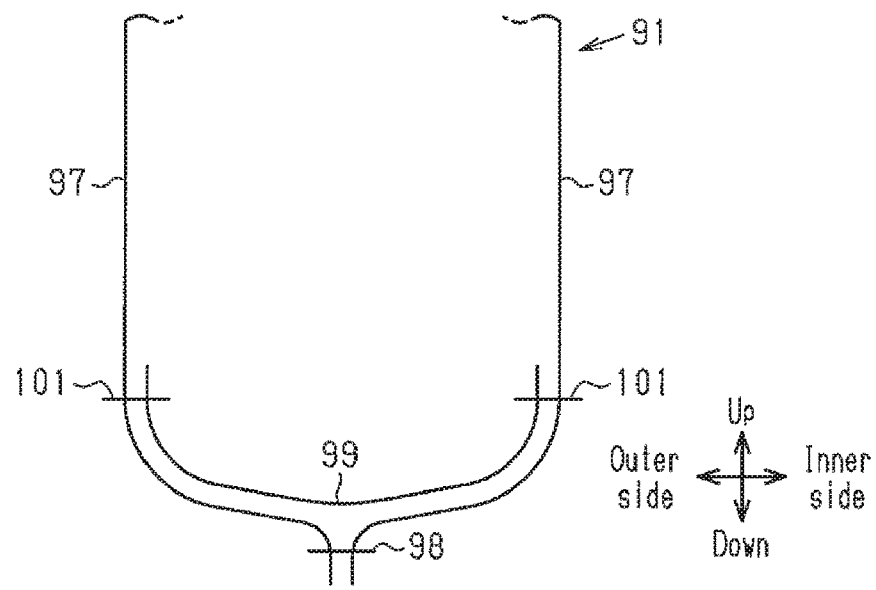
FIG. 13 is a cross-sectional view taken along line 13-13 of FIG. 12.

FIGS. 12 and 13 show an inner tube 91 of a modification. This inner tube 91 has fabric portions 97 superposed onto each other in the vehicle width direction and are joined together by a sewn part 98 provided on the periphery. In FIG. 12, the sewn part 98 is represented by intermittently arranging thick line segments of a constant length in order to distinguish it from the dashed lines (hidden lines). The same applies to a sewn part 101, which will be discussed below.

The inflation gas discharged from the gas outlet portion 74 contacts the sewn part 98. Thus, the sewn part 98 may be defined as a member subjected to an increase in heat resistance by a heat-resistance increasing fabric sheet. FIGS. 12 and 13 show a modification in which a heat-resistance increasing fabric sheet 99 is arranged between the gas outlet portion 74 and a portion of the sewn part 98 below the gas outlet portion 74. The heat-resistance increasing fabric sheet 99 has a three-layer structure similar to the heat-resistance increasing fabric sheet 95. The heat-resistance increasing fabric sheet 99 is joined to the fabric portions 97 by the sewn part 101.

In this modification, some of the inflation gas discharged radially outward from the gas outlet portion 74 strikes the heat-resistance increasing fabric sheet 99. The inflation gas is restricted from directly striking a part of the sewn part 98 below the gas outlet portion 74 by the heat-resistance increasing fabric sheet 99. Since the heat of the inflation gas is unlikely to be transferred to the sewn part 98, the sewn part 98 is prevented from being carbonized by the inflation gas, so that scattering of carbonized parts is suppressed.

Modifications to Second and Third Embodiments

As the cylinder-type inflators 49 and 73, an inflator that generates gas using a gas generating agent may be used. Alternatively, a hybrid type inflator that uses both a gas generating agent and a high-pressure gas may be used. In a hybrid-type inflator, an igniter is first ignited and the gas generating agent is ignited by the heat generated by the igniter. The high-pressure gas is heated by the heat of the gas generated by the combustion of the gas generating agent, which raises the gas pressure. The pressurized high-pressure gas is then discharged from the gas outlet portion as inflation gas. In either method, high-temperature and high-pressure inflation gas is injected from the gas outlet portion 51, 74. The use of the heat-resistance increasing fabric sheet 63, 95, 96, 99 suppresses aging deterioration of the heat-resistant layer and peeling of the heat-resistant layer from the base fabric sheet.

Modifications to First to Third Embodiments

Two or more of the heat-resistance increasing fabric sheets 26, 63, 95, 96, 99, 108, 113 may be superposed and arranged between the gas outlet portion 16, 51, 74 and a member subjected to an increase in heat resistance. Also, a single sheet of the heat-resistance increasing fabric sheet 26, 63, 95, 96, 99, 108, 113 may be folded to have multiple layers and arranged between the gas outlet portion 16, 51, 74 and a member subjected to an increase in heat resistance.

The heat-resistance increasing fabric sheet 26, 63, 95, 96, 99, 108, 113 may be joined to a member subjected to an increase in heat resistance by a joining means such as sewing, bonding, or the like.

When many heat-resistance increasing fabric sheets made of the same material as the main body fabric portion 23, 57, 78 are used in order to ensure the heat resistance, sewing becomes difficult. In contrast, in the case of the heat-resistance increasing fabric sheet 26, 63, 95, 96, 99, 108, 113, the number of the sheets to be used is reduced, facilitating sewing.

Among the members constituting the airbag 22, 56, 77, if the members that contact the inflation gas are referred to as direct injection gas contacting members, the heat-resistance increasing fabric sheet 26, 63, 95, 96, 99, 108, 113 may be arranged between the gas outlet portion 16, 51, 74 and two or more of the direct injection gas contacting members. That is, two or more direct injection gas contacting members may be defined as members of which the heat resistance is increased by the heat-resistance increasing fabric sheet 26, 63, 95, 96, 99, 108, 113.

The heat-resistance increasing fabric sheet 26, 63, 95, 96, 99, 108, 113 may be employed in airbag apparatuses other than the driver's seat airbag apparatus 10, the front passenger seat airbag apparatus, the side airbag apparatus 40, the knee airbag apparatus, and the curtain airbag apparatus 70, which are described above.

The heat-resistance increasing fabric sheet 26, 63, 95, 96, 99, 108, 113 can be applied not only to airbag apparatuses of private cars but also to airbag apparatuses installed in various types of industrial vehicles.

The above-described heat-resistance increasing fabric sheet 26, 63, 95, 96, 99, 108, 113 may be used in airbag apparatuses of conveyances other than vehicles, for example, airplanes, boats, and ships and protect occupants from impacts.

The invention claimed is:

1. A heat-resistance increasing fabric sheet for an airbag that is deployed and inflated by inflation gas discharged from a gas outlet portion of an inflator, wherein
   a plurality of members constituting the airbag includes a plurality of direct injection gas contacting members, which contact the inflation gas,
   at least one of the direct injection gas contacting members is defined as a member subjected to an increase in heat resistance,
   the heat-resistance increasing fabric sheet is configured to increase a heat resistance of the member subjected to an increase in heat resistance,
   the heat-resistance increasing fabric sheet comprising:
   a base fabric sheet, which is made of cotton fibers and arranged between the member subjected to an increase in heat resistance and the gas outlet portion;

a heat-resistant layer, which is made of aluminum foil laminated on a surface of the base fabric sheet that faces the gas outlet portion; and a top coat layer, which is made of a plastic film laminated on a surface of the heat-resistant layer that faces the gas outlet portion.

2. The heat-resistance increasing fabric sheet for an airbag according to claim 1, wherein the base fabric sheet is composed of a plain-woven fabric.

3. The heat-resistance increasing fabric sheet for an airbag according to claim 2, wherein, as the plain-woven fabric, one with the following tensile strengths is used: at least 400 newtons in an arrangement direction of warp threads when a test piece having a width of 3 cm is used, and at least 400 newtons in an arrangement direction of weft threads when a test piece having a width of 3 cm is used.

4. The heat-resistance increasing fabric sheet for an airbag according to claim 1, wherein the aluminum foil has a thickness from 5 μm to 30 μm.

5. The heat-resistance increasing fabric sheet for an airbag according to claim 1, wherein the top coat layer is made of one of a polyamide film, a polyethylene film, an oriented polypropylene film, a polyethylene terephthalate film, and a polyvinylidene chloride film.

6. The heat-resistance increasing fabric sheet for an airbag according to claim 1, wherein the top coat layer has a thickness from 5 μm to 30 μm.

7. The heat-resistance increasing fabric sheet for an airbag according to claim 1, wherein the base fabric sheet has a thickness from 10 μm to 100 μm.

* * * * *